Sept. 27, 1966     P. T. MARTIN     3,275,831

RADIATION BEAM SHUTTER COLLIMATOR

Filed May 16, 1963

Inventor
Philip T. Martin
By Charles M. Hutchins
ATTORNEY

United States Patent Office 3,275,831
Patented Sept. 27, 1966

3,275,831
RADIATION BEAM SHUTTER COLLIMATOR
Philip T. Martin, Columbus, Ohio, assignor to Industrial Nucleonics Corporation, a corporation of Ohio
Filed May 16, 1963, Ser. No. 280,975
11 Claims. (Cl. 250—105)

This invention relates generally to radiation devices and more specifically to a novel beam-controlling structure which not only permits complete attenuation of the radiation beam during periods of inoperation but, which also collimates the radiation beam during the normal operating mode of said device.

Gauges utilizing radiation source-detector units as a transducer element have seen increasing usage in industrial applications of every sort. These units include a source of radiation which may be either of the nuclear or of the X-ray tube type and a detector such as an ionization chamber separated from the source by a measuring gap. Materials to be measured are placed in the gap and the amount of beam attenuation resulting from their presence is measured in accordance with the magnitude of electrical current induced in the chamber. Collimating devices comprising slotted or drilled blocks have been placed in the beam to direct it in a predetermined manner toward the detector to effect certain desirable measuring characteristics or to limit the external field in the vicinity of measurement. A radiation-opaque shutter movable into the beam has also been utilized to substantially eliminate the beam from the measuring gap for purposes of health safety or to permit certain standardization procedures.

Difficulty arises when these units are subjected to the severe requirements of the industrial environment. First of all, the problem of compact design requires that these collimating and shuttering elements be of small size to fit in the housing. Secondly, vibration may cause momentary dislocations of the collimator and shutter plate which interfere with the beam and cause the detector output to change.

Accordingly, the present invention is concerned with eliminating these problems by providing a unitary structure which not only provides beam attenuation in the closed position but which also functions in the open position as a beam collimator which is insensitive to vibratory movements normally encountered in an industrial gauging application.

It is also an object of the present invention to provide a radiation beam-controlling structure which is simple to construct, requires less mounting space and is more reliable in operation than expedients used heretofore.

Briefly stated, in accordance with one aspect of the present invention, a reverse-tapered collimating slot is provided in a block of radiation shielding material which is movable relative to the radiation beam. The slot is formed so that the edges of the narrowest portion thereof move in a path substantially parallel to the beam when the block is subjected to relatively small movements. A larger movement reorients the collimating slot with respect to the radiation beam and the beam is substantially attenuated by the solid portion of the shielding block.

The foregoing, as well as many other features of the present invention, will become more apparent upon reference to the following description when taken in conjunction with the accompanying drawings, in which.

Figure 1:
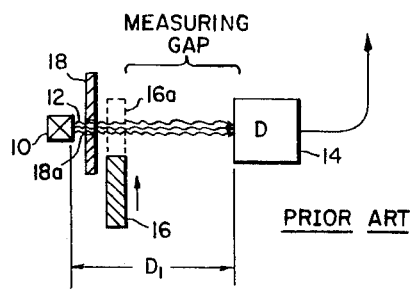
FIG. 1 is a diagrammatic view of a typical prior art source detector unit showing separate beam collimating and shuttering elements.

To properly orient the present invention with respect to the current art, FIG. 1 shows a conventional radiation gauging system. A source of radiation 10 provides a beam of radiation represented by the curvilinear lines 12. A detector 14 is usually mounted some distance $D_1$ from the source to provide a space referred to as a measuring gap for insertion of materials to be measured in terms of their radiation absorption characteristics. Further information in regard to this measuring technique may be had by referring to U.S. Patent 2,829,268 issued Apr. 1, 1958 to H. R. Chope.

It is desirable to "turn the beam off" when not measuring and to this end a heavy shutter plate 16 of radiation opaque material is mounted to be slidably movable to the dotted position 16a wherein it intercepts substantially all of the radiation 12 generated by the source 10. It is further desirable to channel as much of the energy from the source as possible toward the detector. Another block 18 also constructed of radiation absorbing material is usually mounted in a fixed position between the source 10 and the shutter plate 16 and is provided with one or more apertures 18a permitting a restricted portion of the beam 12 to enter the measuring gap. Reference to a particular shutter construction may be had by referring either to U.S. Patent No. 2,885,450 issued to B. C. Holben on Oct. 28, 1958 or to Patent 2,932,744 issued to D. F. Lehman on Apr. 12, 1960.

The sensitivity of the detector is improved in certain applications with the use of the collimating block 18. The response of the detector is also a function of the separation distance $D_1$ as dictated by the inverse square law of radiation as well as certain other geometrical factors. Placing the detector closer to the source boosts the response tremendously; however, the shutter and collimator assemblies require a considerable fraction of the radiation path for mounting purposes and a measuring gap of minimum length must be maintained.

Figure 2:
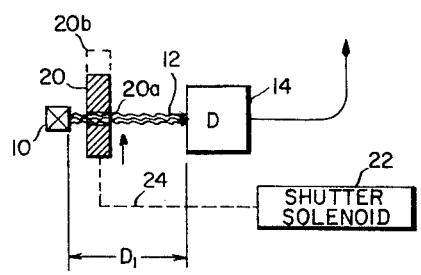
FIG. 2 is a simplified block diagram of a combined radiation collimating shutter assembly illustrating certain principles underlying the present invention.

Referring now to FIG. 2, a structure is shown which combines the collimating feature of the block 18 and the radiation-absorbing feature of the shutter 16 into a single member 20. This collimating shutter is constructed of radiation opaque material and is provided with a radiation aperture 20a. The aperture 20a may be of any desired cross-sectional shape, e.g. circular, square, or rectangular. The shutter member is movably mounted so that the axis of the aperture is in alignment with the source and detector units. To cut off the beam 12, a shutter solenoid 22 or other actuator drives the shutter to the position 20b by means of the mechanical linkage represented by the dotted line 24. It is apparent that with this arrangement the separation distance $D_1$ can be considerably reduced thereby improving the system response. Moreover, the distance through which the shutter has to travel from the "open" to the "closed" position is considerably lessened.

Figure 3:
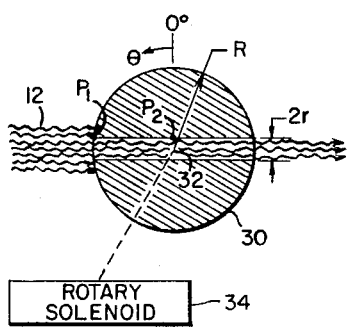
FIG. 3 is a sectional view of a rotary shutter assembly further illustrating certain principles underlying the present invention.

A cylindrical shutter-collimator 30, as shown in FIG. 3, occupies a minimum portion of the radiation path, while at the same time maintaining a beam collimating path of suitable length and providing the radiation shielding feature of the shutter 20 shown in FIG. 2. The shutter-collimator 30 may be mounted for rotation about the axis 32 transversely situated with respect to the beam of radiation 12. The aperture 30a is drilled with the longitudinal axis thereof perpendicular to the axis of rotation 32. A rotary solenoid 34 is used to drive the shutter from an open position ($\theta=0°$) to a closed position ($\theta=90°$).

In the closed position the longitudinal axis of the collimating aperture 30a is oriented perpendicular to the path of incident radiation 12. The radiation is attenuated by the solid portion of the cylindrical shutter thereby shielding the detector 14 from the field of the source 10.

Figure 4:
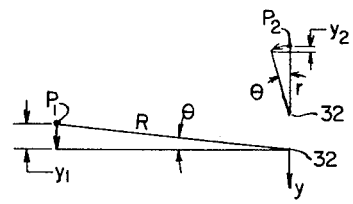
FIG. 4 is a sketch illustrating some of the geometrical relationships of the rotary shutter shown in FIG. 3 useful in explaining the operation of the present invention.

In approaching the subject matter of the present invention, all of the above shutter devices have been found to suffer from effects of vibration of the source-detector assembly. In the normal measuring mode of operation of the instrument, the edges of the shutter slot interfere with the useful beam of radiation. Problems concerned with radiation geometry do not lend themselves to a simple mathematical treatment, but a brief trigonometric argument will serve to explain how the collimator design of the present invention may be considerably improved. With reference now to both the cylindrical shutter of FIG. 3 and the sketch in FIG. 4, and assuming for purposes of simplicity that the collimating aperture 30a is of circular cross-section of radius $r$ and that the shutter is constructed of a somewhat larger radius R, it will be shown that a point $P_1$ located on the aperture and the cylinder surface will project further into the beam 12 than a point $P_2$ located on the radiation aperture but in the center of the shutter 30. Arbitrarily selecting a Y-axis as shown, an estimate of the downward displacements $y_1$ and $y_2$ of points $P_1$ and $P_2$, respectively, can be made. Assuming a small counter-clockwise rotation of $\theta$ radians, $$y_1 = R\theta \quad (1)$$

and $$y_2 = r - r \cos \theta$$
$$y_2 = r(1 - \cos \theta)$$
$$y_2 = r\left[1 - \left(1 - \frac{\theta^2}{2!} + \frac{\theta^4}{4!} \cdots \right)\right] \quad (2)$$
$$y_2 \cong r\frac{\theta^2}{2!}$$

But since $$R > r$$

and $$\theta \ll 1 \text{ radian}$$
$$R\theta \gg r\frac{\theta^2}{2!}$$

or $$y_1 \gg y_2 \quad (3)$$

These results indicate that the point $P_1$ will encroach upon the beam 12 much faster than the point $P_2$ for a given disturbing angular displacement in $\theta$; however both of these points lie on a beam edge defining contour of the aperture 30.

Figure 5:
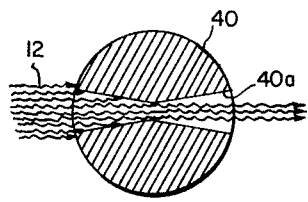
FIG. 5 is a sectional view of a rotary beam-controlling structure embodying the present invention.
Figure 6:
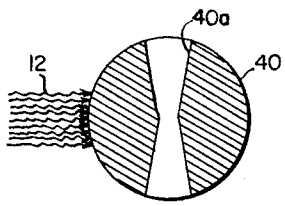
FIG. 6 is a sectional view of the structure shown in FIG. 5 illustrated in an alternate closed position.

In the improved structure shown in FIG. 5, a shutter 40 is provided with a doubly-diverging or reverse-tapered aperture 40a which places the beam defining edge at the center of the shutter. Neither the angle nor the shape of the longitudinal section of the aperture 40a is critical. The peripheral points of the aperture are located far enough from the core of the beam that they cannot engage the same unless a very large angular displacement of the shutter occurs. Some difficulty may be experienced in machining the desired shape so it may be desired to utilize only a single tapering aperture in which case it is important to rotate the shutter about an axis passing through the end of narrower cross-section. The rotary sloenoid 34 may be energized from a power supply 42 to rotate the shutter 90° on command into the position shown in FIG. 6 wherein all of the incident radiation is absorbed by the solid shielding portions of the shutter 40.

The reverse-tapered construction of the beam-controlling structure of the present invention lessens the requirements for mechanical stability and rigidity and at the same time has less effect on the useful beam of radiation. Straight cylindrical bore cylindrical collimators have been found to cause a change in output radiation of 1 part in $10^3$ while a change of 1 part in $10^4$ is found with the reverse-tapered collimator of similar dimensions. This improvement is especially important when a gauging system is required to respond to very minute changes in a physical property such as density.

Although only certain specific and preferred embodiments of the present invention have been shown herein, it is to be expressly understood that many modifications thereof are possible without departing from the scope and true spirit of this invention.

I claim:

1. A structure for collimating a beam of radiation directed from a source of radiation toward a detector, said structure comprising a cylindrical member mounted for rotation about a longitudinal axis transversely situated with respect to said radiation beam, said member having a reverse-tapered radiation aperture provided therethrough with the axis thereof positioned perpendicular to said axis of rotation, the cross-sectional area of said aperture being smaller at the center of said member at the intersection of said longitudinal axes than at the surface of said member, and means for rotating said cylindrical member by $\pi/2$ radians from a first position with the axis of said aperture coincident with said radiation beam to a second position wherein said axis of said aperture is perpendicular to said beam.

2. In a radiation device, gauging apparatus having a source of radiation providing a beam of radiation toward a detector, a combined shutter and collimator structure comprising a body of shielding material between said source and detector movable about a transverse axis perpendicular to said radiation beam from a first position passing said beam to said detector and to a second position blocking said beam, said structure having a double-tapered radiation aperture extending through said shielding body with the longitudinal axis thereof coincident with said radiation beam in said first position, said aperture being of smallest cross-section in a plane perpendicular to said longitudinal axis and containing said transverse body axis.

3. A combined shutter and collimator structure for radiation emanating from a source and directed toward a detector separated on a line path of radiation from said source, said structure comprising a movable body of shielding material located between said source and said detector having an axis of motion intersecting said line path of radiation, a tapered hole in said shielding body having a longitudinal axis coincident with said line path of radiation and intersecting said axis of movement at right angles, said hole being of narrowest bore at the intersection of said axes and flaring outwardly to the surface of said shielding body.

4. Apparatus for controlling a beam of radiation comprising:
a shielding member in said beam having
a first axis passing transverse to said beam and
a tapered aperture narrowing to a reduced cross-section and having an axis transverse to said first axis, and
means rotatably mounting said member about said first axis to position said aperture into and out of alignment with said radiation beam.

5. Apparatus for controlling a beam of radiation comprising:
a shielding member in said beam having
a first axis transverse to said beam and
a tapered aperture having a reduced cross-section, said aperture having an axis intersecting said first axis substantially at said reduced cross-section, means rotatably mounting said member about said first axis to position said aperture into and out of alignment with said radiation beam.

6. Apparatus for controlling a beam of radiation, comprising:

a shielding member in said beam having
a first axis passing transverse to said beam and
a reverse-tapered aperture having a reduced cross-section,
said aperture having an axis intersecting said first axis substantially at said reduced cross-section, and means rotatably mounting said member about said first axis to position said aperture into and out of alignment wtih said radiation beam.

7. Apparatus for controlling a radiation beam, comprising:

a source providing said beam of radiation,
a detector to receive said radiation beam,
means interrupting said beam including
a shielding member,
said shielding member having a first axis passing transverse to said beam and a tapered aperture narrowing to a reduced cross-section and having an axis transverse to said first axis, and means rotatably mounting said member for movement about said first axis.

8. Apparatus for controlling a radiation beam, comprising:

a source providing said beam of radiation,
a detector to receive said radiation beam,
means interrupting said beam including
a shielding member,
said shielding member having
a first axis passing transverse to said beam and a tapered aperture narrowing to a reduced cross-section,
said aperture having an axis intersecting said first axis substantially at said reduced cross-section, and means for rotating said member about said first axis to position said aperture into and out of alignment with said radiation beam.

9. Apparatus for controlling a radiation beam, comprising:

a source providing said beam of radiation,
a detector to receive said radiation beam,
means interrupting said beam including
a shielding member,
said shielding member having
a first axis passing transverse to said beam and a reverse-tapered aperture narrowing to a reduced cross-section.
said reverse-tapered aperture having an axis intersecting said first axis at said reduced cross-section whereby slight movements of said shielding member about said first axis do not materially affect said radiation beam, and means for rotating said member about said first axis to position said aperture into and out of alignment with said radiation beam.

10. Apparatus for controlling a beam of radiation, comprising:

a source providing said beam of radiation,
a detector for receiving said beam of radiation, and
means interrupting said beam including
a cylindrical shielding member having
a longitudinal axis,
a tapered aperture narrowing to a reduced cross-section,
said aperture having an axis intersecting said first axis substantially at said reduced cross-section and means for rotating said member about said first axis to position said aperture into and out of alignment with said radiation beam.

11. Apparatus for controlling a beam of radiation, comprising:

a source providing said beam of radiation,
a detector for receiving said beam of radiation, and
means interrupting said beam including,
a cylindrical shielding member having
a longitudinal axis,
a reverse-tapered aperture narrowing to a reduced cross-section,
said aperture having an axis intersecting said first axis at said reduced cross-section whereby slight movements of said cylindrical shielding member about said first axis do not materially affect said radiation beam and means for rotatably displacing said shielding member about said first axis to position said aperture into and out of alignment with said radiation beam.

References Cited by the Examiner

UNITED STATES PATENTS

| | | | |
|---|---|---|---|
| 1,455,795 | 5/1923 | Logan | 88—61 |
| 2,665,387 | 1/1954 | Bartow | 250—105 |
| 3,107,276 | 10/1963 | Cohen | 250—105 |

FOREIGN PATENTS

| | | |
|---|---|---|
| 683,846 | 6/1930 | France. |
| 736,912 | 12/1932 | France. |

RALPH G. NILSON, *Primary Examiner.*

JAMES W. LAWRENCE, *Examiner.*

A. R. BORCHELT, *Assistant Examiner.*

UNITED STATES PATENT OFFICE
CERTIFICATE OF CORRECTION

Patent No. 3,275,831　　　　　Dated September 27, 1966

Inventor(s) Philip T. Martin

It is certified that error appears in the above-identified patent and that said Letters Patent are hereby corrected as shown below:

Column 2, line 35, "2,885,450" should read ---2,858,450---;
Column 2, line 71, "the" should read ---an---.
Column 3, line 73, "sloenoid" should read ---solenoid---.
Column 5, line 18, "wtih" should read ---with---;
Column 5, line 58, "cross-section." should read ---cross-section,---.

SIGNED AND
SEALED
JUN 23 1970

(SEAL)
Attest:

Edward M. Fletcher, Jr.
Attesting Officer

WILLIAM E. SCHUYLER, JR.
Commissioner of Patents